(12) United States Patent
Sturgill

(10) Patent No.: US 6,975,410 B1
(45) Date of Patent: Dec. 13, 2005

(54) MEASURING DEVICE

(76) Inventor: Dennis T. Sturgill, 25600 Normandy West, Perrysburg, OH (US) 43551

( * ) Notice: Subject to any disclaimer, the term of this patent is extended or adjusted under 35 U.S.C. 154(b) by 36 days.

(21) Appl. No.: 10/407,223

(22) Filed: Apr. 7, 2003

Related U.S. Application Data

(60) Provisional application No. 60/372,400, filed on Apr. 15, 2002.

(51) Int. Cl.$^7$ ............................................. G01B 11/06
(52) U.S. Cl. ..................................................... 356/631
(58) Field of Search ................................ 356/630–632, 356/239.1–239.8, 237.1–237.5, 240.1, 335–343, 356/600–622; 250/223 B, 573, 574; 382/110, 382/141

(56) References Cited

U.S. PATENT DOCUMENTS

| | | | | |
|---|---|---|---|---|
| 2,998,745 A | * | 9/1961 | McClellan | .................. 356/632 |
| 3,307,446 A | * | 3/1967 | Rottmann | .................. 356/632 |
| 3,631,526 A | * | 12/1971 | Brunton | ................. 250/339.11 |
| 3,807,870 A | * | 4/1974 | Kalman | ....................... 356/630 |
| 4,660,980 A | * | 4/1987 | Takabayashi et al. | ....... 356/504 |
| 4,822,171 A | * | 4/1989 | Brand et al. | ................ 356/632 |
| 4,859,861 A | * | 8/1989 | Mersch | .................. 250/559.22 |
| 5,289,265 A | * | 2/1994 | Inoue et al. | ................. 356/632 |
| 5,291,271 A | * | 3/1994 | Juvinall et al. | ............. 356/632 |
| 5,513,533 A | * | 5/1996 | Wheeler et al. | .............. 73/657 |
| 5,729,343 A | * | 3/1998 | Aiyer | .......................... 356/504 |
| 6,285,451 B1 | * | 9/2001 | Herron | ....................... 356/630 |
| 6,781,103 B1 | * | 8/2004 | Lane et al. | .............. 250/201.4 |
| 6,806,459 B1 | * | 10/2004 | Ringlien et al. | ........ 250/223 B |

* cited by examiner

Primary Examiner—Hoa Q. Pham
(74) Attorney, Agent, or Firm—Donald K. Wedding

(57) ABSTRACT

A method is provided for measuring the wall thickness of transparent articles using non-collimated and diverging light in the form of a small point source or elongated narrow line of light, measuring the spacial separation of the reflections from the nearest and furthest surface by means of a two-dimensional image sensor and a computational device to calculate the geometrical corrections needed to provide accurate thickness measurements. In situations where smooth thickness variations occur, a symmetrical two view embodiment using two non-collimated and diverging light sources and two image sensors at equal but opposite angles of incidence from the same side of the object provides a means to correct for errors caused by internal prism effects as a result of undulations of either the nearest or furthest surface.

16 Claims, 10 Drawing Sheets

MEASURING DEVICE

RELATED APPLICATION

Priority is claimed under 35 USC 119(e) for abandoned provisional patent application 60/372,400, filed Apr. 15, 2002.

FIELD OF THE INVENTION

The present invention relates to an optical wall thickness measuring device for transparent or semitransparent articles, suitable for high speed measurements on plate, tubing, flat or curved sheets, or a container production line. This invention may be practiced with any transparent material, amorphous or crystalline, which has two surfaces in close proximity to each other, and has flat or positively curved shape.

BACKGROUND OF THE INVENTION

Optical methods have been used to measure the thickness of transparent materials for decades. Specifically, if one directs a small beam of radiation at a uniform smooth transparent plate, then detects and measures the location of the reflections originating from the inner and outer surfaces, at an angle away from normal to the surface, the spacial separation of the two reflections is a function of the angle of incidence and reflection, the optical index of refraction of the plate, and thickness of the plate at the point where the reflections occur. A summary of this technique is taught in U.S. Pat. No. 4,902,902 by Tole. If the transparent plate is not uniform, such that the two surfaces are not parallel, then the spacial separation of the two reflections is also a function of the angle between the two surfaces at the point of reflection and the distance at which the measurement is made.

As used herein, transparent means clear, translucent or partially transmitting such that a discernible image of the second surface reflection can be formed and detected, at some wavelength of elctromagnetic radiation.

For many transparent articles or objects such as float glass, windows or glass containers and glass tubing, the parallelism, uniformity, or concentricity of the two surfaces cannot be well controlled for example because of viscosity variations in the plastic forming state. The undulations in the inner or outer surface can cause prism effects, which produce very significant errors in the thickness measurement based on the spacial separation of the two reflections. In this case, if a small collimated light source such as a Laser beam is used for illumination, the inside surface reflected beam will not exit the outer surface parallel to the reflection from the outer surface. The spacial separation of the two reflections is then a function of the distance from the object to the measuring system and the surface wedge angle in the plane of the two light beams.

Collimated light is a beam of light for which the exiting rays are essentially parallel and does not appreciably change its cross-section area with increasing distance from the source. Non collimated light may be converging or diverging, or a combination of both on different axis.

A problem with collimated or converging source illumination is that it requires exact object surface placement to keep both of the surface reflections within the field of view of the detector. A typical embodiment of the two surface reflection techniques is to set a collimated illumination source and the detector array very close to the article or object being measured. The close proximity of the detector to the article will reduce the offset of the two reflected beams at the detector caused by surface tilt or from internal surface undulations. However, using a short optical path length does not correct for the internal prism error. Also, a close spacing between the wall thickness measurement device and the article being inspected makes it very difficult to measure non-flat or noncircular articles or objects such as flask shaped containers.

Another problem with collimated point source illumination such as a Laser beam, is that each measurement samples only a very small area of the article. A typical situation is provided by rotating a cylindrical article in a captive fixture, as taught by Juvinall et.al. U.S. Pat. No. 5,291,271, allows multiple point measurements to be taken over the entire circumference at one elevation. Measurements at one elevation may not be representative of thickness in the area, and a major thin or thick spot nearby could be missed if it occurs above or below the circumferential scan. The use of multiple scanning heads can provide additional measurements at different elevations, but the vast majority of the article surface is not inspected.

SUMMARY OF THE INVENTION

In accordance with this invention, there is provided a non-contact method and apparatus to measure thickness readings for an article or object over a large area of the article being measured as it is moved or rotated past the measurement apparatus.

Also, there is provided a method and apparatus to simultaneously provide valid measurements for a sheet, plate, or three dimensional positively curved surface in areas of axially non-uniform surface profile such as conical tapers, axial curves and circumferential ribs.

The practice of this invention does not require precise placement of the article being measured with respect to the position of the measurement device.

This invention also allows the measurement of wall thickness for container type articles with noncircular cross section or non-cylindrical contour.

The practice of this invention provides a wall thickness measurement system which optically corrects for prism effects caused by waves and undulations in front or back surface.

In accordance with one particular embodiment of this invention, there is used a non-collimated and diverging source of light with a narrow elongated shape. A diverging non-collimated light source is one for which the light rays are emitted in all directions spreading outward from the source. When the reflections of this bright line are observed coming from a transparent flat plate or from a transparent positively curved smooth sheet, with the major axis of the curved surface parallel to the axis of the line of light, two nearly parallel reflection lines are seen when viewed from an angle perpendicular to the axis of the light. The separation between these two reflections is a function of the distance to the observer, the angle of incidence and reflection, the thickness distance between the two surfaces, and the index of refraction of the transparent material. If the geometry is held constant, differences in the separation between the two surfaces can be seen as resulting changes in the separation of the two reflected lines.

A line of diverging non-collimated light may be produced in several ways. One way is to place a long narrow slit in front of a light diffuser plate which is illuminated from behind. Rays from the diffuser possessing a multitude of different directions, pass through the slit such that the slit appears bright when viewed over a wide solid angle. Another way to produce a line of non-collimated light is to use a long narrow hot filament inside a suitable transparent envelope or a narrow column of non-focused Light Emitting Diodes. Another way is to use a light directing object such as a fiber optic cable formed into a long narrow line without subsequent alteration by a lens. The spreading of the rays exiting the fibers produce a sufficiently divergent non-collimated source to practice this invention.

If the article or object producing observable reflections of the line of light, is moved perpendicular to the axis of the light source, then a large area of the surface can be examined for variation of the thickness.

When the observer is replaced with a two dimensional image sensor, such as a digital camera, a suitable lens to magnify and focus the reflection lines onto the sensor, and a digital processor to analyze the reflections, the device becomes a thickness gauge, capable of measuring the wall thickness of the object along the lateral extent of the reflection. If the article or object is moved perpendicular to the line of light reflection, large areas of the object can be measured.

This technique is especially useful for transparent hollow objects, which can be rotated about their axis. If the line of light is oriented parallel to the axis of a cylinder, and the image sensor is placed at a large angle away from the plane of line light and cylinder axis, two lines of reflection will be seen by the sensor, indicating the wall thickness along the line on the object where the reflections are occurring. If the cylindrical object is now rotated about its axis, the entire wall area in the field of view of the sensor can be measured for wall thickness.

A substantial standoff distance can be used for both the line light source and the sensor, typically 2 to 12 inches (50 to 300 mm). If the axis of a hollow cylinder shifts during the rotation, within the limit that the reflections remain in the field of view of the sensor, accurate measurements of the thickness of the walls can still be calculated, providing the change in the location of the reflecting surface relative to the sensor is known. The standoff distance can be selected to provide the largest field of view of the object, consistent with necessary measurement resolution of the distance between the two reflection lines. As the standoff distance is increased, it becomes increasingly difficult to resolve and accurately measure the separation of the two reflection lines.

The lens used to magnify and focus the reflected lines into the sensor should be operated with a small entrance aperture to provide the greatest depth of field possible, if large movement of the object is expected. Using a very small entrance aperture will reduce the amount of light reaching the sensor, so a reasonable trade-off must be selected.

It is important to understand that with diverging non-collimated light, the geometry of the measurement will change as the object is moved relative to the light source and sensor. As the object is moved directly toward or away from the light source and sensor, the angles of incidence, reflection and refraction will change, and the object distance to the sensor lens system will change, but the first surface reflection will always occur at the point on the object where the angle of reflection, normal to the surface, is equal to the angle of incidence. When using collimated or focused light, the angle of incoming light is fixed, and the object must be maintained in the proper position to maintain the angle of reflection which intercepts the sensor.

With divergent non collimated light, as the object is moved laterally, parallel to the plane of the light source and sensor, the angles of incidence and reflection will remain essentially the same, but the location of reflections will move on the object to the new location where the angles of incidence and reflection are equal. If the object has positive curvature, the distances from the light source and sensor to the reflection point may also change. In any case, the change in the distance between the reflection point and the sensor will cause a change the spacial separation of the first and second surface reflections as seen by the sensor. If the location of the reflections with respect to the light source and sensor is known, the calculation of the wall thickness based on the measured spacial separation of the reflections is a matter of geometry. Present day high speed computers can perform the necessary geometrical corrections in real time.

Because these calculations are very complex, a practical approach is to use a known uniform thickness calibration object, which is moved throughout the anticipated movements of the unknown object, to form a matrix of calibration constants versus object position. Interpolation is then used to perform the positional corrections.

The system described above can make sufficiently accurate measurements for most applications providing the wall thickness does not change significantly over short distances. Regions of rapidly changing thickness introduce significant prism into the thickness geometry, leading to significant errors in the measurement based on the reflection separation.

To avoid this problem and achieve the benefits and advantages of this invention, there is introduced a second line of non-collimated light and a sensor which provides a nearly exact reproduction of the geometry of the first system, but in which the position of light source and sensor are transposed. For example, if a uniform wall thickness object being measured is stationary and a second light source is moved to exactly the same location occupied by the first sensor, and a second sensor is moved to exactly the same location occupied by the first light source, then the light paths for the two beams reflected from the inner and outer surfaces will be exactly reproduced with the exception that the direction of the light path will be reversed. And in this example, if the distance from the object to both sensors is the same, and the two surfaces are parallel or concentric, the spacial separation of the two inner and outer surface reflections will be exactly reproduced by both light source and sensor pairs.

However, if this dual light source and sensor system is applied to an object where the inner or outer surfaces are not uniform and parallel or in the case of circular cross-section not concentric, such that localized prisms effect are produced, each light path which reaches the sensor will have been deviated as a result of the prism angle. The magnitude of each beam deviation will have been equal, but will occur in the opposite direction for each light source and sensor pair. When the two beam separations are averaged together, after correcting for any differences in object distance for each sensor, the remaining beam separation depends only upon the index of refraction of the object, the angle of incidence and the separation of the two surfaces at the point the reflections occurred.

Using diverging non-collimated lines of light as the light source for the dual path system, each sensor will see two lines of light with variable line spacing due to wall thickness and prism variations. The prism effects can be eliminated by adding the magnification corrected spacial beam separations together for each location on the object and dividing by two. If the localize prism effects are severe, the inner and outer reflections from one of the sensors may be transposed, indicating a negative thickness. In this case, the algebraic sign of each beam separation must be maintained before the summation occurs.

An illustration of optical correction for prism effects using collimated and subsequently focused light is taught in German PCT Patent Application W099/56076 by Kiessling et al, where in the superposition of a point source of collimated light and the second system sensor is achieved through the use of beam splitters. This system disclosed in this PCT publication is technically correct, but is largely impractical because precise position of the cylindrical object must be maintained to ensure that the both reflection pairs occur at the same point on the object and that the reflected light arrives at the sensor.

In accordance with this invention, the use of the diverging non-collimated light sources for the dual path system removes the requirement for very precise positioning of the cylindrical object. No matter where the object is placed in the field of view of both sensor systems, the two pairs of reflected lines will be seen coming from nearly the same points on the object, and an accurate wall thickness can be calculated, if the relative location of the object is known.

The use of two transposed non-collimated light sources and two sensors also provides the positional information need to make the necessary corrections in the calculations. That is because triangulation is possible so that each sensor system can tell the other sensor system at what distance the two reflections are occurring. Knowing the two object distances, and the fixed distance between the two light source/detector systems, the angles of incidence and reflection can be calculated, thus providing all of the information needed to correct the calculation of wall thickness for movement of the reflecting surfaces. This capability makes it possible to make accurate wall thickness measurements on non-round or irregular shaped objects such as flask containers as they are rotated in the field of view of the sensors.

In the prior art, as shown in U.S. Pat. No. 5,259,265 Inoue et.al and U.S. Pat. No. 5,636,027 Spengler et.al collimated light and beam splitters are used in the thickness measurement devices. However, beam splitters are not necessary to obtain the benefits of this invention. It has been found that if the diverging light sources are placed very close to the entrance aperture of the sensor's lenses, the resulting prism correction is adequate for most applications. This can be accomplished by placing the line of light very close to the side of lens, or by providing a mirror which covers a non-transmitting part of the sensor lens and acts to reflect the light from the source, such that the virtual image of the light source appears to be closely adjacent to the entrance aperture of the lens when viewed from the object position. The slight offset will produce a small error in the optical correction, but it is insignificant where compared with a single light source and sensor system.

For highest accuracy, it is important that the source or the virtual image of the source of the diverging non collimated line source of light fall exactly on the optical axis and on the entrance aperture of the sensor focusing lens. If it appears in front or behind the entrance aperture, an optical parallax effect will be introduced as the object being measured moves in the sensor field of view. One practical way to accomplish this requirement is with beam splitters. It is beneficial, when using beam splitters, to place the diverging source in front of the splitter at an angle as small as possible from the optical axis of the sensor system. The purpose of making the angle small is to avoid as much as possible, the polarization of the light reflecting from the beam splitter. This will help maintain the intensity of the second surface reflection when highly colored or light absorbing transparent objects are being measured.

The practice of the highest accuracy embodiment can also be achieved by placing a long light emitting filament directly at the entrance aperture of the sensor lens, masked in such a way that no light from the filament can directly enter the sensor system. The light used to form the images of the reflections pass on either or both sides of the masked light filament. This configuration eliminates the harmful polarization effects which occur at a beam splitter.

In one preferred embodiment of this invention, a line of light is used which is considerably longer than needed to illuminate the field of view of the sensor. The curvature of the surface of the object plus the undulations of one or both of the surfaces, in the direction of the line of light, may produce a light deflection angle sufficiently large,to cause loss of signal to the sensor. Making the line of light longer than what seems necessary will eliminate most of these events.

DESCRIPTION OF DRAWINGS

Figure 1:
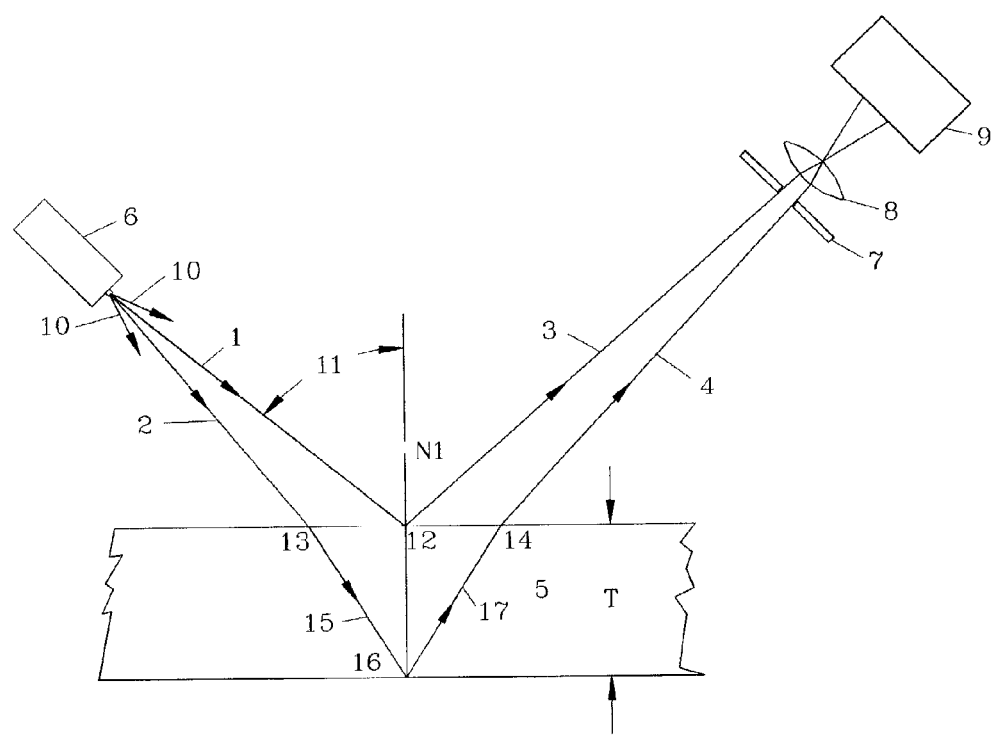
FIG. 1 shows a simplified diagram of an embodiment of an apparatus for measuring the wall thickness of a transparent object.

FIG. 1 shows a simplified diagram of the reflections of a non-collimated diverging light source 6, originating from a uniform transparent plate 5, with thickness T, at some arbitrary angle away from normal to the surface N1. Suitable angles fall in the range of 20° to 70°. The light source 6 may be a single point of light or a line of light with axis parallel to the surface such as can be produced by the filament of an incandescent bulb. When the light rays coming from the source represented by line 1 encounter the first surface of the plate at point 12, part of the beam is reflected along path 3 for which the angle of reflection is equal to the angle of incidence and the resulting beam trajectory passes through the lens aperture 7. Light rays passing through aperture 7, then pass through imaging lens 8 which focuses the rays on the active array of the sensor 9. A second ray of the incident light represented by line 2, encounters the plate 5 at point 13 and part of the beam is refracted into the plate along path 15. This beam encounters the back side of the plate at point 16 and a portion of the beam is reflected along path 17, then again encounters the first surface of the plate at point 14. After refraction back to the original angle of incidence, the ray represented by line 4 passes through the lens aperture 7, at a different angle than first surface reflection ray 3. All of the other rays represented by lines 10 emanating from light source also produce reflected and refracted rays, but they do not arrive at the lens aperture and therefore are not focused onto the measurement sensor 9.

Since the beams of light 3 and 4 enter the lens 8 at different angles, each is focused on the sensor 9 at a different location. The spacial separation of the two beam images on the sensor is a function of the angle of incidence, the optical index of refraction of the plate, the distance from the plate to the sensor lens, the magnification of the lens and sensor system and the thickness of the plate T. If the index of refraction of the plate and the angle of incidence are known, the spacial separation of the two beams is a direct indicator of the plate thickness assuming that the magnification of the image on the sensor 9 by the lens 8, is known and fixed. Note that if the plate 5 in FIG. 1 is tilted, it has the same optical effect as rotating the position of the light source and sensor system. Then different rays will reflect from the inner and outer surfaces at different angles of incidence and reflection, and the location of the reflection will move to a new location wherein the angles of incidence and reflection are equal. This new location cannot be easily determined, which forces the practical requirement that the plane of the object remains fixed, such as placement in a flat surface.

Usually a lens assembly such as 8 is used to produce an image of the two reflected light spots on a sensor which can quantify the separation of the two beam images. The beam separation is converted to wall thickness readings either by geometrical calculations or by comparison with calibration charts produced from measurements with known thickness plates.

Figure 2:
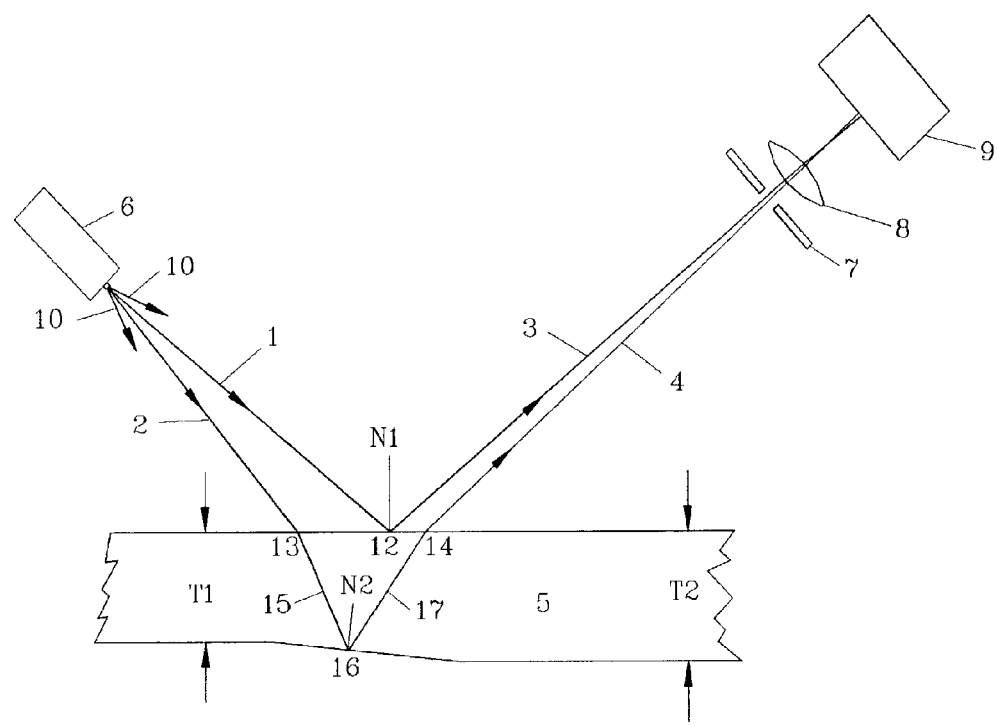
FIG. 2 shows a simplified diagram similar to FIG. 1 in which the plate thickness makes a rapid change from thickness T1 to thickness T2.

FIG. 2 shows a similar diagram in which the plate thickness makes a rapid change from thickness T1 to thickness T2. In this case when the refracted internal ray 15 encounters the second surface at a point 16 where the thickness is changing, it is again reflected at an angle equal to its angle of incidence with respect to the normal of the second surface N2. The angular deviation produced by the sloped second surface is equal to twice the slope angle. When the internally reflected ray re-encounters the first surface at point 14, it is refracted at a wider angle further increasing the beam deviation error. In this case, spacial separation of ray 3 and ray 4 now depends on the second surface slope angle and how far the measurement sensor is away from the plate.

The change in the direction and separation of the internally reflected rays is called the prism effect. Very slight changes in the parallelism between the first and second surface, can cause significant errors in the wall thickness measurement based on reflected beam separation. Even with a close spacing between the object being measured and the sensor assembly, the internally reflected beam can be deviated to such a degree that is misses the sensor completely. When a diverging non-collimated light source is used, as shown in FIG. 2, a reflected and refracted light path which reaches the sensor usually exists, but the internally reflected ray may be deviated to such a degree that the rays which reach the sensor may cross over the first surface reflection indicating a negative thickness. In the past, this problem has discouraged the use of diverging non-collimated light.

Figure 3:
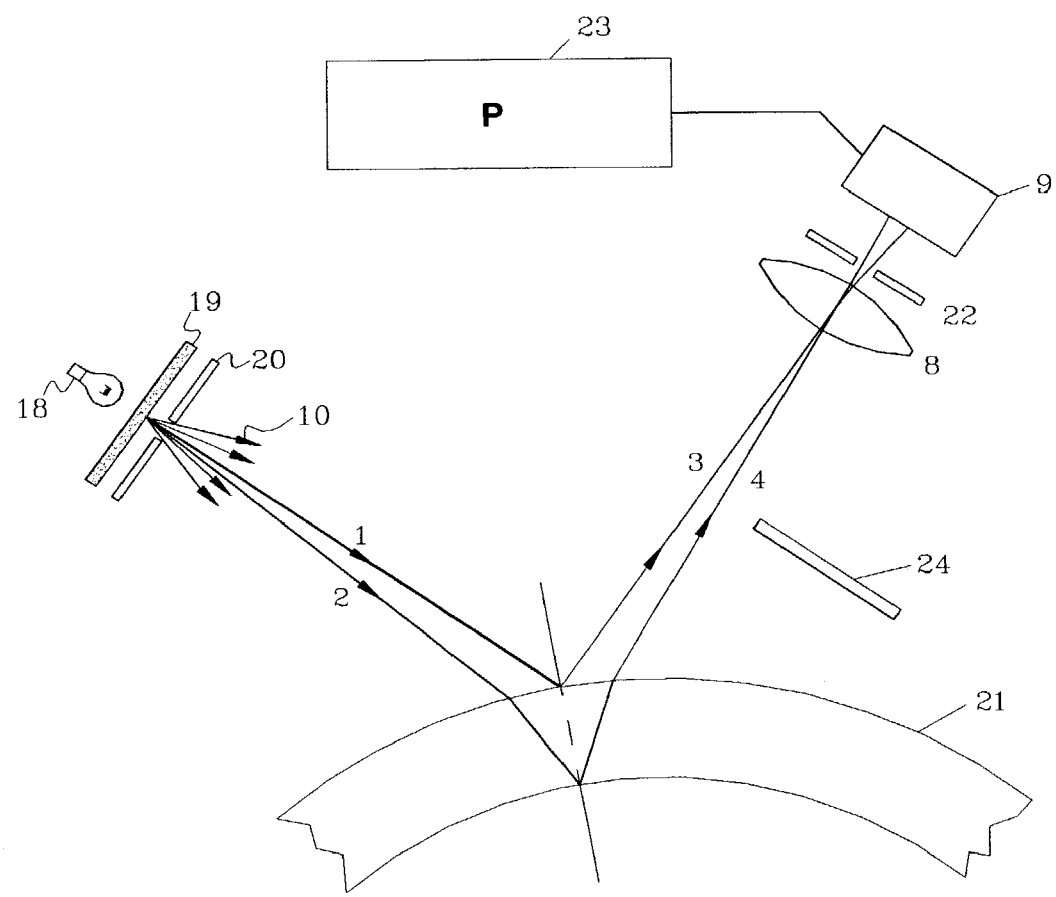
FIG. 3 shows a schematic diagram of a portion of another alternative embodiment of the inventive thickness measurement.

An illustration of the optical geometry created when using a diverging non-collimated light source to measure the wall thickness of a positively curved uniform wall thickness hollow object, is shown in FIG. 3. The source of light 18 can be an incandescent light bulb or any luminous source of sufficient intensity. In this case, a light diffuser 19, is placed between the light source and a narrow vertical slit (20) to ensure uniformity of the multitude of light rays passing through the slit. The narrow slit 20 is shown in cross-section, so that only the width of the slit is illustrated in the drawing. The long axis of the narrow slit is shown as parallel to the cylindrical axis of object 21.

This assembly is placed at a suitable distance from the article to be measured, typically 2 to 12 inches (50 to 300 mm). A sensor assembly consisting of an imaging lens (8), an aperture stop (22), and a two dimensional sensor array (9) is placed at suitable distance from the article to be measured, typically 2 to 12 inches. The light source assembly and the detector assembly are separated in such a way that the sum of the angle of incidence and the angle of reflection, falls in the range of 40° to 140°. The two-dimensional sensor array must be designed to provide a large enough field of view to capture both the outer or first surface and the inner or second surface reflections for the desired height of the inspection and for the expected movement of the reflections due to a non-circular shape of the article, or movement of the article in the field of view. This is accomplished by adjusting the standoff distance and magnification of lens 8.

The light rays, 1 and 3, reaching the sensor in FIG. 3 will reflect from a line on the outer surface of the object, where the angle of incidence, normal to the surface equals the angle of reflection. The magnitude for these angles will depend on distance between the light source and the detector assembly, and the distance to the object. The light rays, 2 and 4, which are refracted and internally reflected will be reflected on the same radial line as the outer surface reflection, but will follow a displaced path caused by the thickness of the wall and the refractions at the outer surface.

The location of the two reflections which reach the sensor will move on the surface of the object as it is moved around the field of view of the sensor assembly. In order to accurately calculate the wall thickness represented by these reflections, the light source location and the distance from the principle plane of the optical system to the reflections must be known. If the only movement of the object or article is pure rotation, then knowing the location of the light source and sensor, and the profile and the orientation of the object is sufficient. These data will allow the calculation of the angle of incidence and reflection at any point on the object and also provide the necessary magnification correction for the reflection images on the sensor array 9.

Also shown in FIG. 3 is a digital processor (23) which provides the capability of rapidly processing the reflection data transferred from the sensor, applying the necessary geometrical corrections to convert the image data to wall thickness values. In some situations, it is useful to apply a panel mask (24), which partially blocks light which would strike the back side of the object, thus eliminating back side extraneous reflections.

When the second surface is not parallel to or coaxial to the first surface, the location of the second surface reflection will be shifted to a point where the angle of reflection, normal to the second surface, is equal to the angle of incidence after both beams have been refracted at the first surface. As discussed earlier, this shift causes a deviation in the spacial separation of the two reflections which reach the sensor. Consequently, the system in FIG. 3 is accurate only for objects which have nearly parallel or concentric surfaces.

Figure 4:
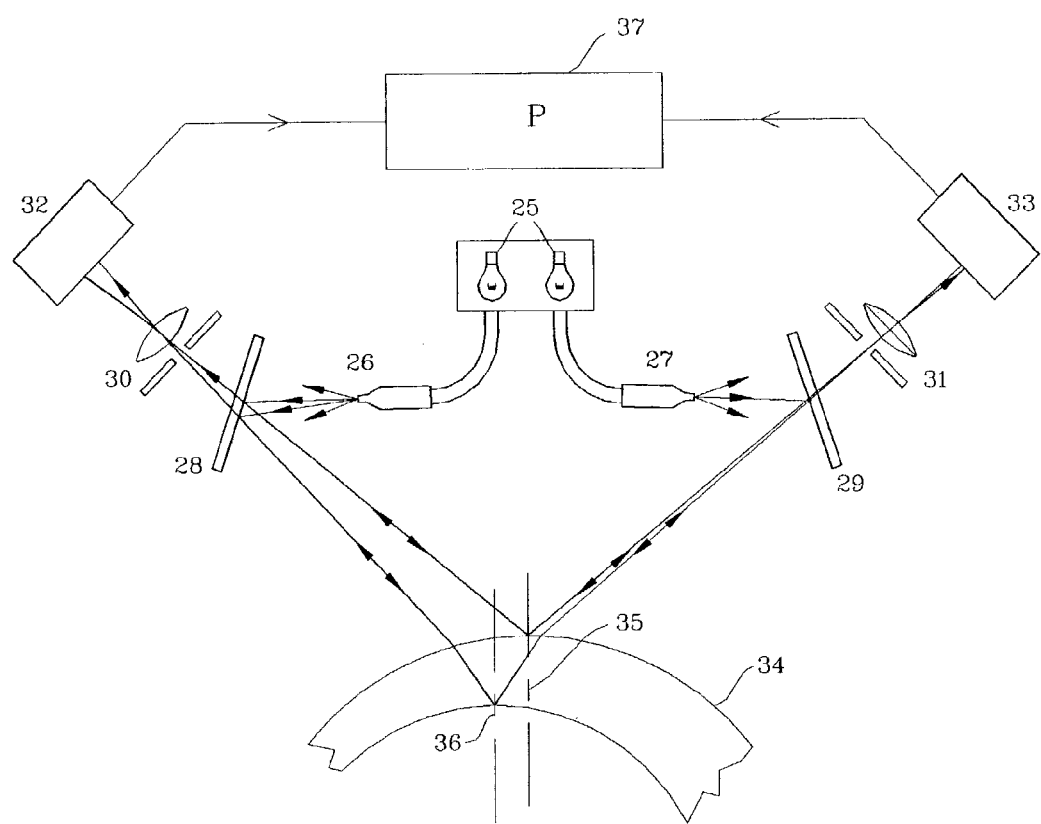
FIG. 4 shows the most accurate and generally preferred embodiment of this invention.

FIG. 4 shows the most accurate and generally preferred embodiment of this invention applied to a circular object, which does not have concentric inner and outer surfaces. In this case the light from one or more light sources 25 is directed into two optical fiber bundles, 26 and 27, which convert the light beams into two long narrow effectively divergent non-collimated light sources. The long axis of the line lights 26 and 27 are perpendicular to the plane of the drawing. The light exiting the fiber optic bundles is directed toward two beam splitters, 28 and 29, which provide approximately 50 percent reflection and 50 percent transmission. Both of the beam splitters are oriented at an angle so as to direct the light toward the object to be measured, such that the virtual image of the line of light is superimposed on the optical axis of the lens systems, 30 and 31, when viewed from the object location. The distance from the line lights 26 and 27 to the reflection point on the beam splitters 28 and 29 is made to be the same as the distance from the reflection points to the entrance aperture of lenses 30 and 31, in order to eliminate parallax effects.

The lenses 30 and 31 focus the image of the reflections originating from the object on the respective sensor arrays 32 and 33. Sensor 32 receives the reflected light originating from fiber optic source 27 after passing through the beam splitter 28 and sensor 33 received the reflected light originating from fiber optic source 26 after passing through the beam splitter 31. The two systems are symmetrical mirror images of each other.

If a flat parallel plate or a uniform wall thickness concentric cylinder is placed in the field of view of both sensors, the images arriving at the sensors will be identical, but reversed in position. To be more specific, the left hand sensor, 33, will see the second surface reflection to the right of the first surface reflection and the right hand sensor, 32, will see the second surface reflection to the left of the first surface reflection, but both will measure the same spacial separation between the two reflections.

In the illustration of FIG. 4, the object to be measured 34 does not have concentric inner and outer surfaces. The rays of light reflecting from the outer or first surface will follow exactly the same path from source 27 to sensor 32 and from source 26 to sensor 33, both reflecting along the outer radius line 35. The portion of light passing through the beam splitters will form the same first surface reflection image on both sensors. However, the location on the second surface where the angle of incidence is equal to the angle of reflection after first surface refraction, is shifted toward the line of the inner radius of curvature 36. The rays of light reflecting from the inner surface will still follow the same path from source 27 to sensor 32 and from source 26 to sensor 33, but the location of the reflection on the inner surface will be shifted to the points on the inner surface where angles of incidence and reflections are equal. This shift in reflection location will cause an increase in the spacial separation of the two reflected rays arriving at left hand sensor 32 and a reduction in the spacial separation arriving at the right hand sensor 33. These two deviations will be almost identical in magnitude for each optical ray path. There can be a very small difference in the two deviations due to the slight difference in the angles of refraction at the first surface. For thin walled curved articles where the radius of curvature is at least ten times the wall thickness, this error is negligible for all practical purposes.

The processor 37 in FIG. 4 receives the digital data from both two dimensional sensors, makes the magnification and image registration corrections if necessary, and adds together the spacial separation for each corresponding point on the object, then divides by two to extract the spacial beam separation representing the wall thickness at each point.

Figure 5:
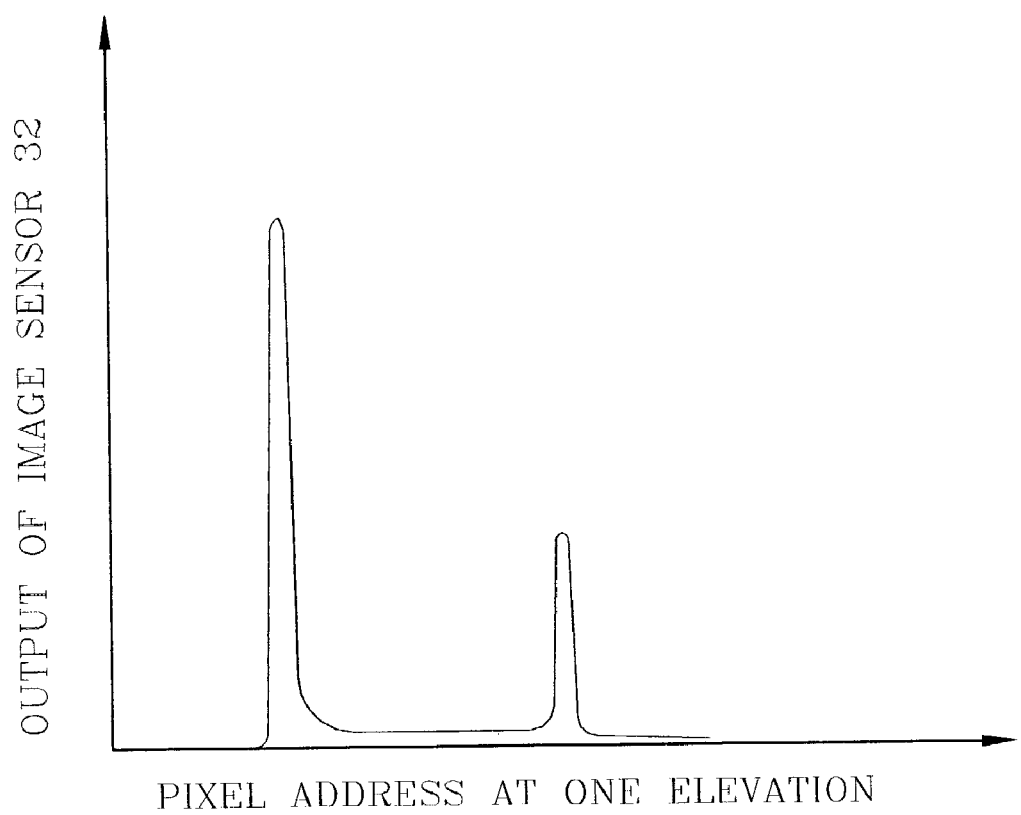
FIG. 5 shows the relationship and intensity of the two reflections from a point on the object which reaches the left hand sensor 32 of FIG. 4.

FIG. 5 shows the relationship and intensity of the two reflections from a point on the object which reaches the left hand sensor 32. The first surface and second surface reflections can be distinguished because the first surface reflection will always provide a more intense reflection.

Figure 6:
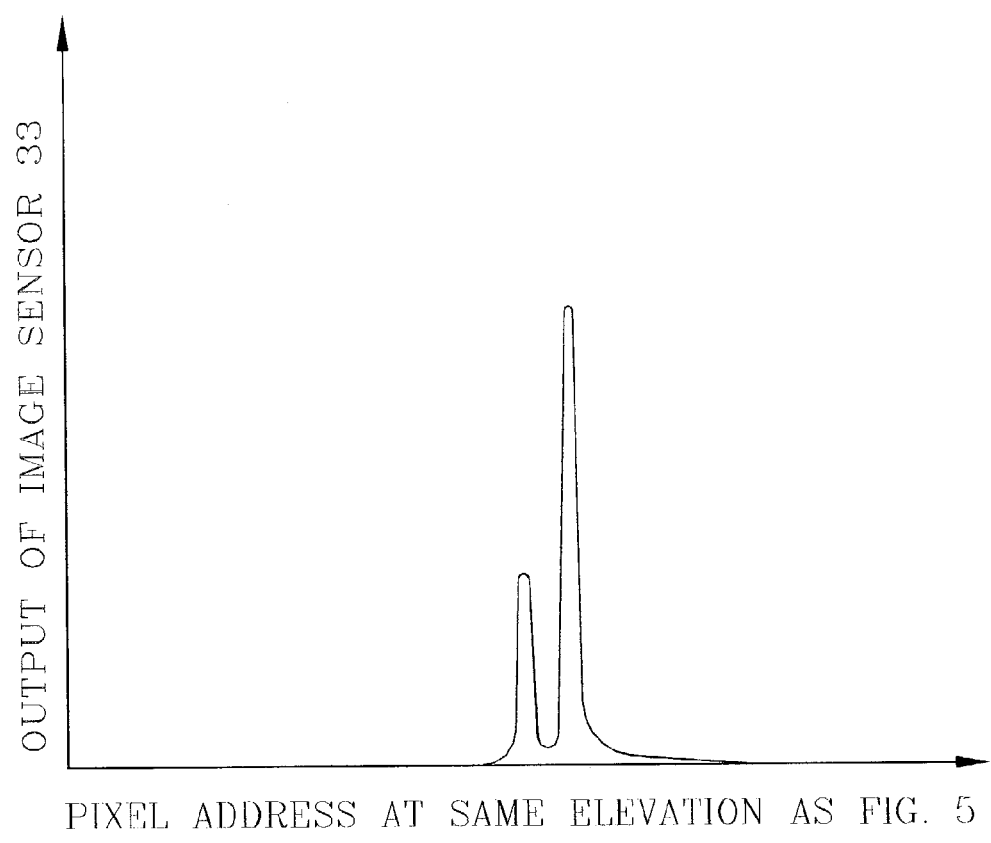
FIG. 6 shows the corresponding reflection images seen by the right hand sensor 33 of FIG. 4.

FIG. 6 shows the corresponding reflection images seen by the right hand sensor 33. If the object distance and magnification of right and left sensors are equal, the two spacial separations can be averaged together to determine what the spacial separation would be if no prism effect was present. If the object distance is not equal, the magnification corrections must be applied before averaging the two spacial separations.

The spacial separation of two reflections can be measured in several ways. One convenient way is to calculate the location of the centroid of each reflection, in fractions of a pixel, and then subtract the smaller pixel centroid value from the larger value. Another way is to curve fit each reflection peak and interpolate for the location of each reflections maximum location, then subtract the maximum locations to determine the spacing between them.

Figure 7:
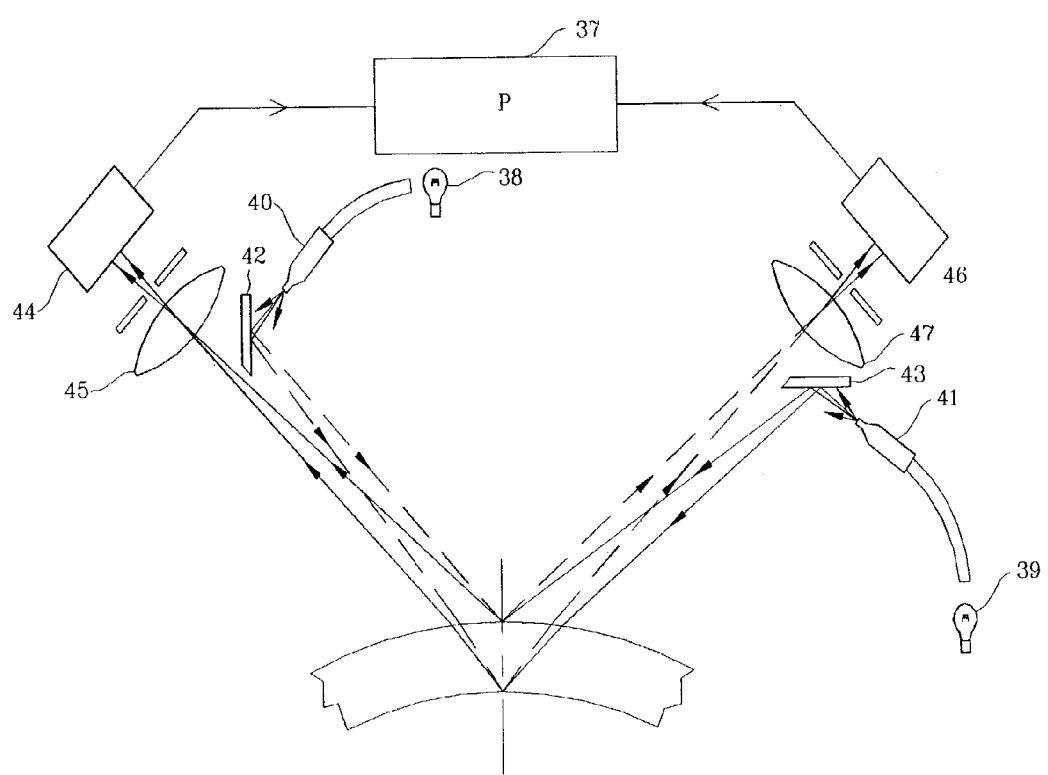
FIG. 7 shows another embodiment contemplated for the practice of this invention which uses reflecting mirrors instead of beam splitters of FIG. 4.

FIG. 7 shows the embodiment contemplated for the practice of this invention which uses reflecting mirrors instead of beam splitters. Light from one or more light sources 38 and 39 is directed into two optical fiber bundles 40 and 41 which convert the light beams into two long narrow diverging non-collimated light sources. The light exiting the fiber optic bundles is directed toward two mirrors 42 and 43 which are situated on the same side of the sensor and lens systems 44, 45, and 46, 47. Both of the mirrors are oriented at an angle, so as to direct the light toward the object being measured, such that the virtual image of the line of light source appears as close as possible to the optical axis and entrance aperture of the lens systems 45 and 47, when viewed from the object location, without blocking the return reflected rays from the object, on their way to the sensor.

With this arrangement of line light sources 40 and 41, sensor 44 and sensor 46 see reflections which occur at the same point on the object, but with slightly different angles of incidence and reflection. Sensor 44 receives reflected light originating from fiber optic source 4, shown as solid lines. Sensor 46 receives reflected light originating from fiber optic source 40, shown with dashed lines, which uses slightly smaller angles of incidence and reflection such that the rays it uses fall inside the rays used by sensor 44.

In this case, if a flat parallel plate or a uniform wall thickness concentric cylinder is placed in the field of view of both sensors, the spacial separation of the first and second surface reflections will not be identical at each of the sensors. The separation imaged at sensor 46 will be slightly smaller than the separation imaged at 44, because the system 40 to 46 will utilize a slightly smaller angle of incidence and reflection with respect to the normal to the surfaces. This small difference is minimized by making the standoff distance as large as possible while retaining the necessary optical resolution. The significance of this slight difference will be further reduced when a known wall thickness calibration object is used to establish the relationship between reflection separation and wall thickness for each sensor.

When the object or article in FIG. 7 does not have uniform walls, the second surface internal reflections will be deviated by the prism effect as was described for FIG. 4. However, in this case the beam deviations will be slightly different because the angles of incidence, reflection and refraction are slightly different. By keeping the difference in the angles of incidence between the two sensor systems very small through the use of a large standoff distance, the thickness reading error caused by simply adding the two beam separations will be insignificant for most measurement applications.

If the line light sources 40 and 41 and mirrors 42 and 43 are placed on opposite sides of the sensor assemblies, for example, both inside or both outside, then the outside surface angles of incidence and refection can be made to be nearly equal, but the two sensor assemblies will be viewing the internal reflections from two slightly different points on the internal surface of the object. In some cases this may turn out to be advantageous.

Figure 8:
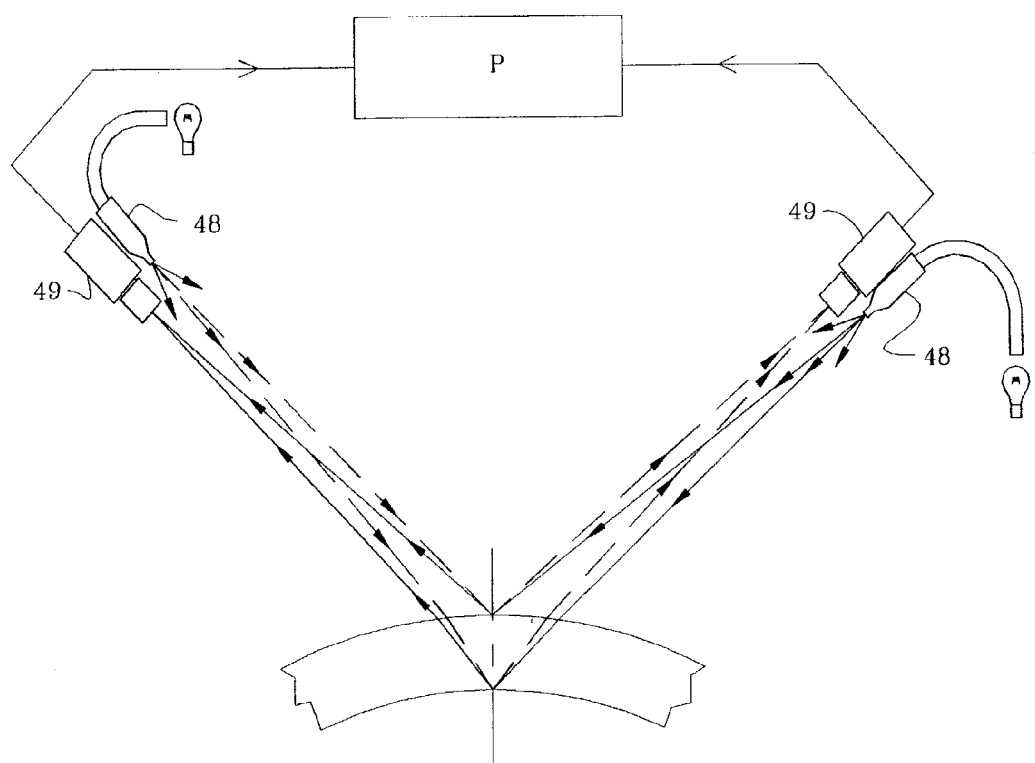
FIG. 8 shows a very simple and low cost embodiment of this invention wherein all mirrors and beam splitters are eliminated.

FIG. 8 shows a very simple and low cost embodiment of this invention wherein all mirrors and beam splitters are eliminated. Fiber optic line lights 48 are placed as close as possible to the side of the two dimensional cameras and lens combinations 49. This configuration provides a somewhat larger spacing between the light source and the optical axis of the detector than shown in FIG. 7. However, for most practical applications, this embodiment will provide sufficiently accurate corrected measurements for most applications.

If the diverging non collimation lines of light are made very narrow and placed directly on the optical axis of the sensor system such that a substantial part of the return reflected rays can pass on one or both sides of the light source, this embodiment can make thickness measurements as accurate as the beam splitter system shown in FIG. 4, providing the sources are small enough to appear at the entrance aperture of the sensor lenses. This is accomplished with a narrow line of Light Emitting Diodes or elongated incandescent light bulb with a thin envelope.

Figure 9:
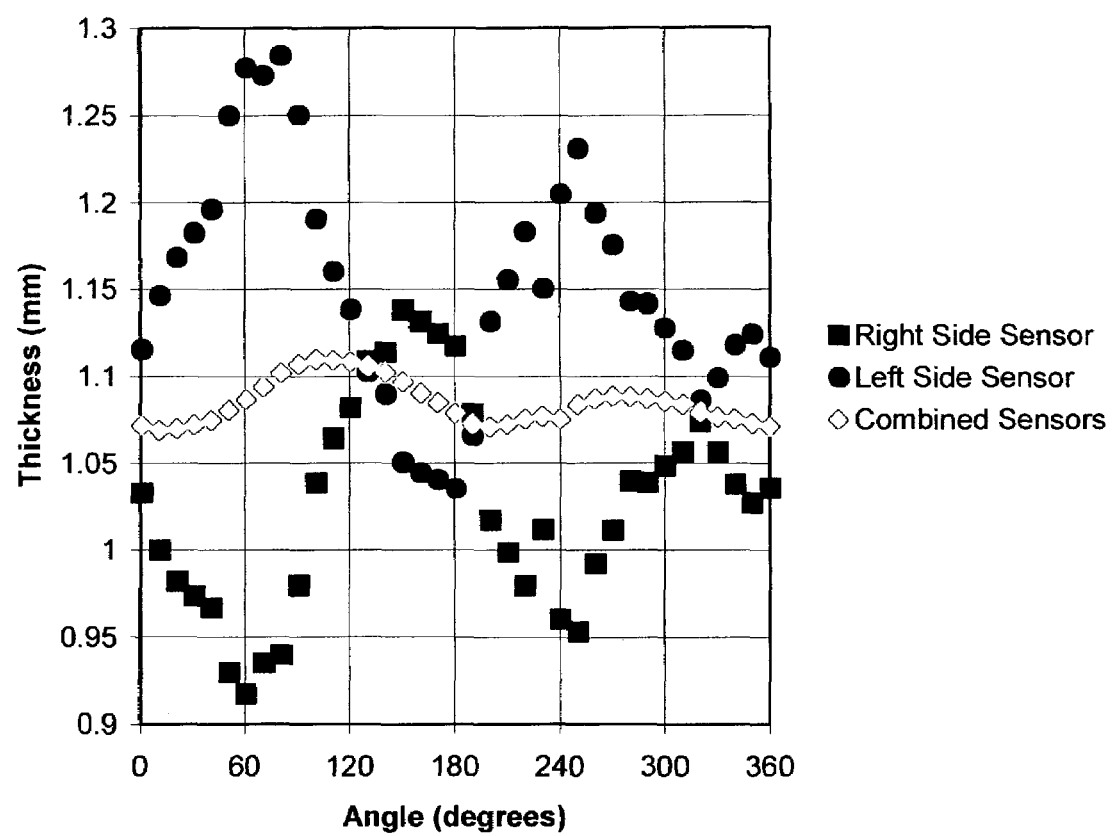
FIG. 9 shows a wall thickness measurement comparison between an uncorrected optical beam reflection system and a reverse path corrective measurement for a circumference profile measurement for a 22 millimeters diameter glass tube with a 1.08 millimeter nominal wall thickness.

FIG. 9 shows a wall thickness measurement comparison between an uncorrected optical beam reflection system and a reverse path corrective measurement for a circumference profile measurement for a 22 millimeters diameter glass tube with a 1.08 mm nominal wall thickness. These data were taken every 10 degrees with an optical system of the type shown in FIG. 8, using a standoff distance of 8 inches (200 mm). The uncorrected data show wide swings in the apparent wall thickness due to internal prism effects, ranging from 0.92 to 1.28 mm. The optically corrected data falls within a range of 1.068 to 1.110 mm. The corrected measurements fall within the allowable tolerance for wall thickness variations. The uncorrected measurements do not.

Figure 10:
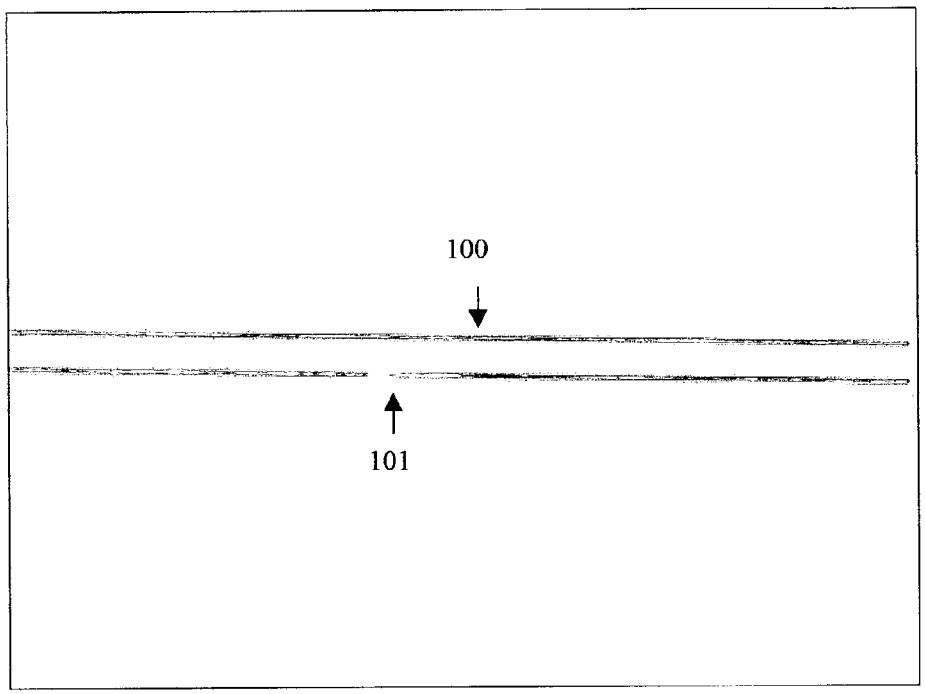
FIG. 10 shows the actual reflection images from one sensor viewing a glass tube which provided the data shown in FIG. 9.

FIG. 10 shows the actual reflection images from one sensor viewing a glass tube which provided the data shown in FIG. 9. Line 100 is the reflection from the outside surface and 101 is the reflection from the inside surface. An interesting feature of this image is the gap in the second surface reflection 101, produced by a very small optical defect in the tube wall. Any of the embodiments of this invention shown in FIGS. 4 through 6 can provide an optical flaw detection in all of the surface areas on which the wall thickness is measured.

What is claimed is:

1. A method for measuring the wall thickness of a transparent object wherein two divergent non-collimated light sources and two area type image sensors are provided such that the light from each light source is re-directed so that it appears to be originating from within the close proximity of the optical axis of each image sensor and the spacial separation measurement of the two reflections from the object obtained by each sensor combined to provide an accurate measurement of the wall thickness after corrections for the variable angle of incidence and reflection are calculated.

2. A method as in claim 1 wherein each light source is a long narrow divergent non-collimated light source.

3. A method as in claim 2 wherein the reflected line images from the object are used to detect optical flaws or anomalties on either surface or in the wall of the object.

4. A method of claim 2 wherein the object is rotated about its axis such that the entire wall area in the field of view of the sensor is measured for wall thickness.

5. A method for measuring the thickness of the wall area of a transparent object wherein two small divergent non-collimated light sources and two area type image sensors are provided such that each non-collimated light source illuminates the object from a position closely adjacent to the entrance aperture of each reflection measuring sensor and the spacial separation measurement of the two reflections from the object obtained by each sensor combined to provide a sufficiently accurate estimate of the wall thickness.

6. In a method for non-contact measurement of the thickness of a transparent object having a first surface and a second surface which comprises measuring the spacial separation of the reflections of light off of the first and second surfaces, the improvement wherein divergent non-collimated light from a first long narrow elongated light source is illuminated onto the object in a first direction to obtain first and second light reflections from the first and second surfaces, and then illuminating the object with divergent non-collimated light from a second narrow elongated light source in a reverse direction substantially over the identical optical paths of the first and second reflections to obtain reverse first and second light reflections from the first and second surfaces and measuring the spacial separation of the reflections in the first direction and measuring the spacial separation of the reflections in the reverse direction so as to obtain the spacial separation of the first and second surfaces.

7. In a method for measuring the wall thickness of a transparent object having inner and outer wall surfaces, wherein light is illuminated onto the object such that a portion is reflected from the outer wall surface and a portion is refracted into the object and reflected off of the inner wall surface, the improvement which comprises a. illuminating divergent non-collimated light from a first long narrow elongated light source on the object, b. measuring the spacial separation of the first and second light reflections from the outer and inner wall surfaces, c. illuminating divergent non-collimated light from a second long narrow elongated light source onto the object in the reverse direction over the identical paths of the first and second light reflections, d. measuring the spacial separation of the reverse reflections from the outer and inner wall surfaces, and e. averaging the measurements of steps b and d after magnification corrections for differences in reflection distance to obtain the spacial separation of the outer and inner surfaces.

8. A method of measuring the wall thickness of a transparent object having first and second wall surfaces, which method comprises a. illuminating divergent non-collimated light from a first long narrow elongated light source onto the object to obtain first and second light reflections from the first and second wall surfaces;

b. measuring the spacial separation of the first and second light reflections from said first and second wall surfaces;

c. illuminating divergent non-collimated light from a second long narrow elongated light source onto the object in the reverse optical direction over the identical optical paths of the first and second light reflections to obtain first and second reverse reflections from the first and second wall surfaces;

d. measuring the spacial separation of the reverse reflections from said first and second wall surfaces; and e. averaging the measurements of steps b and d to obtain the spacial separation of the first and second surfaces.

9. A method of measuring the wall thickness of a transparent or semi-transparent object having first and second wall surfaces, which method comprises a. illuminating divergent non-collimated light from a first long narrow elongated light source onto the wall surfaces;

b. measuring the spacial separation of the first and second light reflections from said first and second wall surfaces;

c. illuminating divergent non-collimated light from a second long narrow elongated light source onto the wall surfaces in the reverse direction over the identical optical paths of the first and second light reflections;

d. measuring the special separation of the reverse reflections from said first and second wall surfaces; and e. averaging the measurements of steps b and d to obtain the spacial separation of the first and second surfaces.

10. Apparatus for measuring the wall thickness of a transparent or semi-transparent object having a first wall surface and a second wall surface, which comprises:

a. a first long narrow elongated light source for illuminating divergent non-collimated elongated light onto the first wall surface such that a portion of the elongated light is reflected from said first wall surface and a portion is refracted into the wall and reflected off the second wall surface;

b. a device for measuring the spacial separation of the first and second elongated light reflections from said first and second wall surfaces;

c. a second long narrow elongated light source for illuminating divergent non-collimated light onto the first and second wall surfaces in the reverse direction over the identical optical paths of the first and second light reflections from the first light source;

d. a device for measuring the spacial separation of the reverse reflections from said first and second wall surfaces; and e. a device for averaging the measurements b and d to obtain the spacial separation of the first and second surfaces over the length of the elongated light reflections.

11. The invention of claim 10 wherein the source for illuminating the object with diverging non-collimated light is an optical fiber assembly.

12. The invention of claim 10 wherein the device for measuring the spacial separation of the first and second light reflections is a two dimensional array digital camera.

13. The invention of claim 10 wherein the means for illuminating the object in the identical optical path in each reverse direction is through the use of optical beam splitters.

14. The invention of claim 10 wherein the device for averaging the measurements to obtain the spacial separation of the first and second surface reflections is a high speed digital computer.

15. The invention of claim 10 wherein the source for illuminating the object in the identical optical path in each reverse direction is through the use of a narrow, elongated line of light located on the axis, said source being a long narrow hot filament inside a suitable transparent envelope.

16. The invention of claim 10 wherein each source for illuminating the object with diverging non-collimated light is a narrow column of light emitting diodes.

* * * * *